(12) United States Patent
Dixit et al.

(10) Patent No.: US 9,734,194 B1
(45) Date of Patent: Aug. 15, 2017

(54) ENCODING TIME INTERVAL INFORMATION

(71) Applicant: Google Inc., Mountain View, CA (US)

(72) Inventors: Nandan Dixit, Palo Alto, CA (US); Piyush Prahladka, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1165 days.

(21) Appl. No.: 13/853,689

(22) Filed: Mar. 29, 2013

Related U.S. Application Data (60) Provisional application No. 61/785,563, filed on Mar. 14, 2013.

(51) Int. Cl.
G06Q 10/00 (2012.01)
G06F 17/30 (2006.01)

(52) U.S. Cl.
CPC ............................. *G06F 17/30424* (2013.01)

(58) Field of Classification Search
CPC . G06Q 10/10; G06Q 10/1093; G06Q 10/1095
USPC ................................ 705/7.18, 7.19; 707/736
See application file for complete search history.

(56) References Cited

U.S. PATENT DOCUMENTS

| | | | |
|---|---|---|---|
| 5,860,067 A | 1/1999 | Onda et al. | |
| 5,960,406 A | 9/1999 | Rasansky et al. | |
| 6,049,332 A * | 4/2000 | Boetje | G11B 27/105 345/6 |
| 7,171,415 B2 * | 1/2007 | Kan | G06F 17/30867 |
| 7,233,933 B2 * | 6/2007 | Horvitz | G06Q 10/109 706/21 |
| 7,580,925 B2 | 8/2009 | Unruh et al. | |
| 7,890,719 B2 | 2/2011 | Gokhale | |
| 7,949,642 B2 * | 5/2011 | Yang | G06F 17/3087 707/706 |
| 8,091,033 B2 | 1/2012 | von Sichart et al. | |
| 8,140,370 B2 * | 3/2012 | Larsen | G06Q 10/06311 705/7.13 |
| 8,301,636 B2 | 10/2012 | Stillion et al. | |
| 8,533,765 B2 * | 9/2013 | Li | H04N 7/17318 725/100 |
| 8,825,736 B2 * | 9/2014 | Agrawal | G06F 17/30241 705/37 |
| 9,432,426 B2 * | 8/2016 | Mao | H04N 21/4305 |
| 9,432,433 B2 * | 8/2016 | Luby | H04N 21/23106 |

(Continued)

OTHER PUBLICATIONS

Gutierrez, C. et al., "Introducing Time into RDF" (Feb. 2007), IEEE Transactions on Knowledge and Data Engineering, vol. 19, No. 2, pp. 207-218.*

*Primary Examiner* — Tiphany Dickerson
(74) *Attorney, Agent, or Firm* — Fish & Richardson P.C.

(57) ABSTRACT

Methods, systems, and apparatus, including computer programs encoded on a computer storage medium, for encoding time interval information. In one aspect, a method includes receiving data specifying a time interval in which a provider is available, encoding the time interval in which the provider is available as one or more data structures that each identify (i) an offset value that specifies a time offset between a baseline time and a beginning of a reference time interval, and (ii) one or more respective time sub-interval values that identify one or more time sub-intervals within the reference time interval, and storing one or more of the data structures in association with the provider.

16 Claims, 6 Drawing Sheets

(56) References Cited

U.S. PATENT DOCUMENTS

| | | | |
|---|---|---|---|
| 2001/0037229 A1* | 11/2001 | Jacobs | G06Q 10/02 705/7.14 |
| 2003/0130882 A1* | 7/2003 | Shuttleworth | G06Q 10/109 709/204 |
| 2004/0052269 A1 | 3/2004 | Hooper et al. | |
| 2008/0086751 A1* | 4/2008 | Horn | H04L 12/1881 725/87 |
| 2010/0241480 A1* | 9/2010 | Rokhlin | G06Q 10/06311 705/7.18 |
| 2014/0006079 A1* | 1/2014 | Keohane | G06Q 10/1093 705/7.19 |
| 2016/0072637 A1* | 3/2016 | Gholmieh | H04L 65/4076 709/219 |

\* cited by examiner

ENCODING TIME INTERVAL INFORMATION

CROSS-REFERENCE TO RELATED APPLICATION

This application claims the benefit of U.S. Provisional Application Ser. No. 61/785,563, filed on Mar. 14, 2013, which is incorporated by reference.

BACKGROUND

The present specification relates to data structures and, according to one particular implementation, to the encoding of time interval information within data structures.

Scheduling applications can assist users with booking appointments and setting up meetings. Information about a user's availability can be tracked by a scheduling application, and in some situations, may be shared with other users. Some scheduling applications may include searching and collaborative scheduling tools to assist users with checking the schedules of other users for availability times.

SUMMARY

In general, entities (e.g., persons, groups, organizations, etc.) can provide their availability times, which may be encoded and stored. To encode a time interval, the hierarchical nature of time (e.g., year, month, week, day, hour, minute, second, etc.) can be used to generate a tokenized representation (e.g., a string token) of the time interval such that the sort order of the string corresponds to the natural progression of time. For example, an initial series of bytes in a string token may represent a high-level offset (e.g., a number of days) from a predetermined baseline time (e.g., a start date/time), subsequent bytes in the string token may represent a lower-level offset (e.g., a block of hours) from the higher-level offset, and so forth. Users (e.g., persons desiring an entity's service) may query the stored representations to determine the availability of an entity at a specified time and/or within a specified time range.

According to one innovative aspect of the subject matter described in this specification, a method includes receiving data specifying a time interval in which a provider is available, encoding the time interval in which the provider is available as one or more data structures that each identify (i) an offset value that specifies a time offset between a baseline time and a beginning of a reference time interval, and (ii) one or more respective time sub-interval values that identify one or more time sub-intervals within the reference time interval, and storing one or more of the data structures in association with the provider.

Other embodiments of these aspects include corresponding systems, apparatus, and computer programs, configured to perform the actions of the methods, encoded on computer storage devices.

These and other embodiments may each optionally include one or more of the following features. For instance, the offset value specifies a number of days between a baseline time and beginning of a day in which the provider is available; the one or more respective time sub-interval values include a multi-hour block value that identifies a multi-hour block within the day in which the provider is available; the day is made up of successive, defined multi-hour blocks that each have a same duration, and the multi-hour block value identifies a position of the multi-hour block among the multi-hour blocks that make up the day; encoding the time interval includes encoding the time interval as (i) a first data structure that identifies the offset value and a first multi-hour block value within the day in which the provider is available, and (ii) a second data structure that identifies the offset value and a second multi-hour block value within the day in which the provider is available; the one or more respective time sub-interval values include an hour value that identifies an hour within the multi-hour block within the day in which the provider is available; the multi-hour block is made up of successive hours, and the hour value identifies a position of the hour among the hours that make up the multi-hour block; the one or more respective time sub-interval values include a sub-hour value that identifies a portion of the hour within the multi-hour block within the day in which the provider is available; the hour is made up of successive portions of the hour that each have a same duration, and the sub-hour value identifies a position of the portion of the hour among the portions of the hour that make up the hour; a query specifying a time interval in which to determine whether the provider is available is received, the time interval in which to determine whether the provider is available is encoded as one or more query data structures that each identify (i) an offset value that specifies a time offset between the baseline time and a beginning of a reference time interval, and (ii) one or more respective time sub-interval values that identify one or more time sub-intervals within the reference time interval, and it is determined whether one or more of the query data structures match one or more of the data structures that are stored in association with the provider.

Advantageous implementations may include one or more of the following features. Storage space may be conserved by encoding time intervals using a small number of tokens. The sort order of a set of tokens used to encode a time interval may correspond with the order of the time interval it represents, thus facilitating range searches. A search on a range encompassing an encoded time interval may be efficiently performed by matching prefixes. Flexible searching may be performed, such as searching for availability in a time interval, availability over a time interval, or availability at a particular time. Various systems can be used, such as key/value storage systems, or other systems that employ key lookups or prefix matching on keys.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
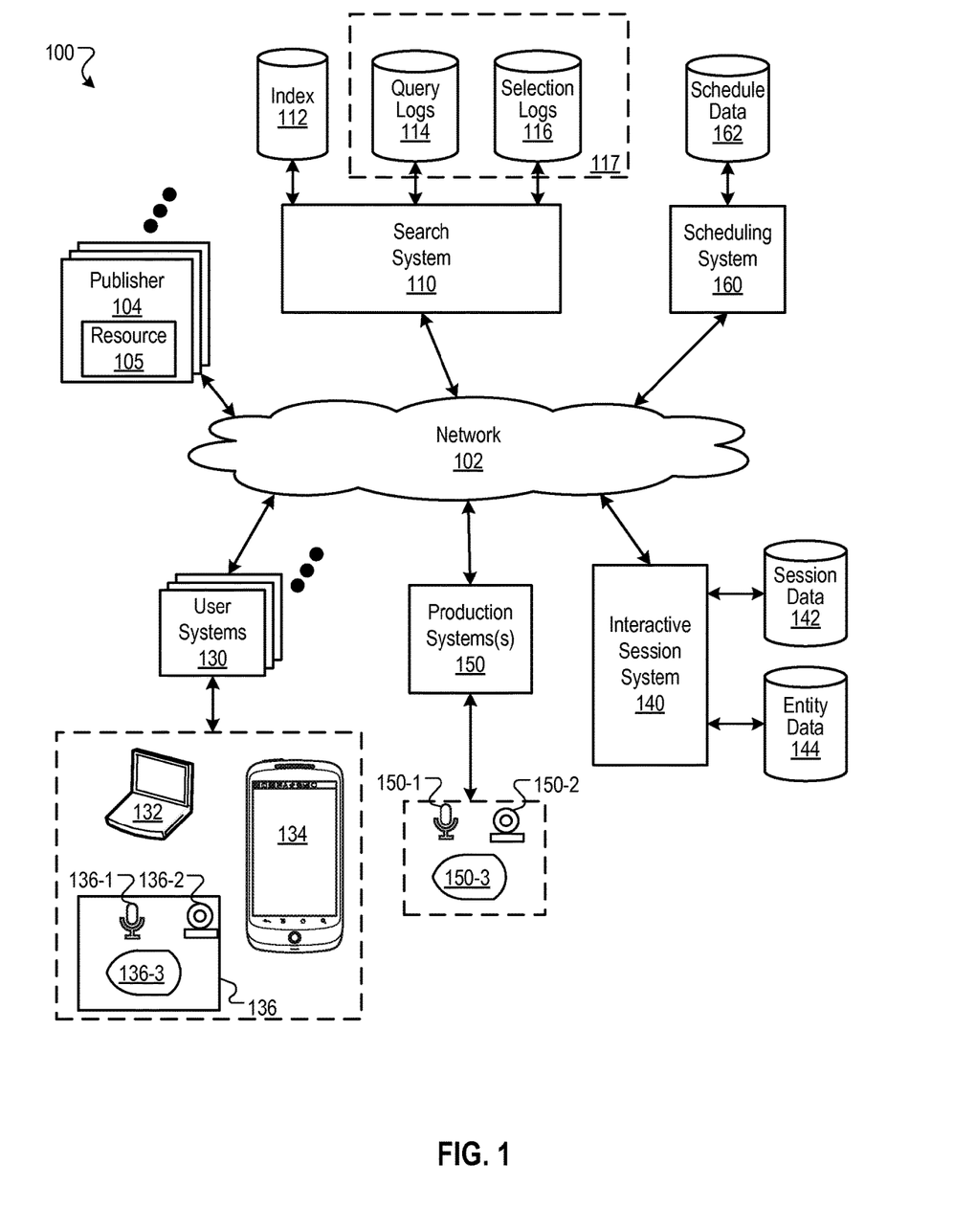
FIG. 1 is a block diagram of an example system in which time interval information can be encoded, stored, and queried.

FIG. 1 is a block diagram of an example system 100 in which time interval information can be encoded, stored, and queried. A data communication network 102 enables data communication between multiple electronic devices. Users can access content, provide content, exchange information, and participate in interactive sessions by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

In operation, a search engine 110 crawls the publisher web sites 104 and indexes the resources 105 provided by the publisher web sites 104 in an index 112. The search engine 110 can receive queries from user devices 130. In response to each query, the search engine 110 searches the index 112 to identify resources and information that are relevant to the query. The search engine 110 identifies the resources in the form of search results and returns the search results to the user device 130. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, e.g., information retrieval ("IR") scores, and optionally a separate ranking of each resource relative to other resources, e.g., an authority score. The search results are ordered according to these scores and provided to the user device according to the order.

A user device 130 receives the search results and presents them to a user. If a user selects a search result, the user device 130 requests the corresponding resource. The publisher of the web site 104 hosting the resource receives the request for the resource and provides the resource to the user device 130.

In some implementations, the queries submitted from user devices 130 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken responsive to search results provided by the search engine 110. The query logs 114 and selection logs 116 can be used to map queries submitted by user devices to resources that were identified in search results and the actions taken by users when presented with the search results in response to the queries.

In some implementations, data are associated with the identifiers from the search requests so that a search history for each identifier can be accessed. The selection logs 116 and query logs 114 can thus be used by the search engine to determine the respective sequences of queries submitted by the user devices, the actions taken in response to the queries, and how often the queries have been submitted.

A user device 130 is an electronic device, or collection of devices, that is under the control of a user and is capable of requesting and receiving resources over the network 102. Example user systems 106 include personal computers 132, mobile communication devices 134, and other devices that can include one or more of an audio input device 136-1, a video input device 136-2, an optional display device 136-3, and optionally other input devices. A user device 130 typically includes a user application, e.g., a web browser, that sends and receives data over the network 102, generally in response to user actions. The web browser can enable a user to display and interact with text, images, videos, music and other information typically located on a web page at a website on the world wide web or a local area network.

An interactive session system 140 is also accessible by the user devices 130 over the network 102. The interactive session system 140 serves interactive sessions and data related to interactive sessions to users of user devices 130. The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 140 may also provide interactive sessions for other appropriate event types.

Furthermore, the data that the interactive session system 140 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session, and the interactive session system 140 may also determine specific data to provide based on the intent. For example, a user that is viewing a session that describes building a computer, and with the intent to build the computer, may be presented with additional information, e.g., a list of parts, tools and the time required to complete the task. Another user that is watching the same session with the intent to learn about computers may be presented with other information, e.g., articles about memory, heat dissipation, or other computer related topics, in a side panel of a viewing environment as the interactive session is presented.

The sessions can be created by expert assistants or non-expert users. The term "expert assistant" is used in this specification to refer to a user or entity that has been accepted by the system 140 for a category, e.g., as a result of the user's or entity's having provided credentials or demonstrated a high level of skill. Examples include a licensed contractor for construction related videos or a company that produces sessions for a particular product the company manufactures and a user that has produced a large number of highly rated sessions Production systems 150 can be used to create sessions. Production systems 150 may range from studios to simple hand-held video recording systems. Generally, a production system 150 is a system that includes one or more of an audio input device 150-1, a video input device 150-2, an optional display device 150-3, and optionally other input devices and production processes that are used to create sessions. For example, post production processes may be used to add metadata to an interactive session. Such metadata may include, for example, keywords and topical information that can be used to classify the session to one or more topical categories; a list of tools and part required for a particular session and descriptions of the tools and parts; and so on.

The sessions are stored as sessions data 142 and are associated with authoring entities by entity data 144. A user can use a user device 130 to access the interactive session system 140 to request a session. The interactive session system 140 can provide a user interface to the user devices 130 in which interactive sessions are arranged according to a topical hierarchy. In some implementations, the interactive session system 140 includes a search subsystem that allows users to search for interactive sessions. Alternatively, the search system 110 can search the session data 142 and the entity data 144.

A user experiences a session by use of one or more user devices 130. Other types of input and output devices may also be used, depending on the type of interactive session. For example, an augmented reality visor that provides a view of a real-world environment augmented by computer-generated graphics may be used. A tactical sensory input device and a tactical sensory output device that applies pressure to a user's body and that the user interprets as simulated motion or other type of feedback may also be used.

Some implementations of an interactive session system 140 provide interactive sessions in real time. For example, real-time sessions may be provided by a company for repairing a product sold by the company when the user cannot find a stored interactive session that fulfills the user's informational needs. Likewise, interactive sessions may be provided as part of a consultation process. For example, an automobile mechanic may contact a user at another location, e.g., the user's home, to consult with the user regarding an automobile repair. The automobile mechanic may then explain to the user, by means of an interactive session that highlights certain parts of the automobile engine as seen from the point of view of the automobile mechanic, certain repairs that are necessary and request authorization from the user to proceed. The user can ask questions and discuss alternatives with the automobile mechanic during the interactive session to make an informed decision.

The availability times and/or non-availability times of expert assistants and other users of the system 100 can be managed by a scheduling system 160, accessible by the user devices 130 over the network 102. For example, an expert assistant can provide information to the scheduling system 160 related to his or her availability for conducting real-time automobile repair consulting sessions with users. An automobile mechanic, for example, may specify availability times as between 1:00 pm and 4:00 pm for a current or future day. Upon receiving the availability information, for example, the scheduling system 160 can encode the expert assistant's availability times as one or more data structures, and can store the data structures as schedule data 162.

To query the schedule data 162, for example, a user can employ one or more user devices 130 to provide time interval information corresponding to a time interval in which to determine whether an expert assistant is available. For example, the user can specify a desired time interval of 2:00 pm to 3:00 pm and can submit the time interval information to the scheduling system 160. The scheduling system 160, for example, can encode the time interval information, e.g., 2:00 pm to 3:00 pm, and can determine whether the encoded time interval matches any data structures stored as schedule data 162. For example, the user may search the schedule of a particular expert assistant, or may search multiple assistants' schedules, based on one or more filtering criteria, e.g., area of expertise. In the present example, the scheduling system 160 can determine that the encoded time interval information provided by the user matches one or more encoded data structures associated with the automobile mechanic, and thus that the automobile mechanic is available during the user's desired time interval.

Figure 2:
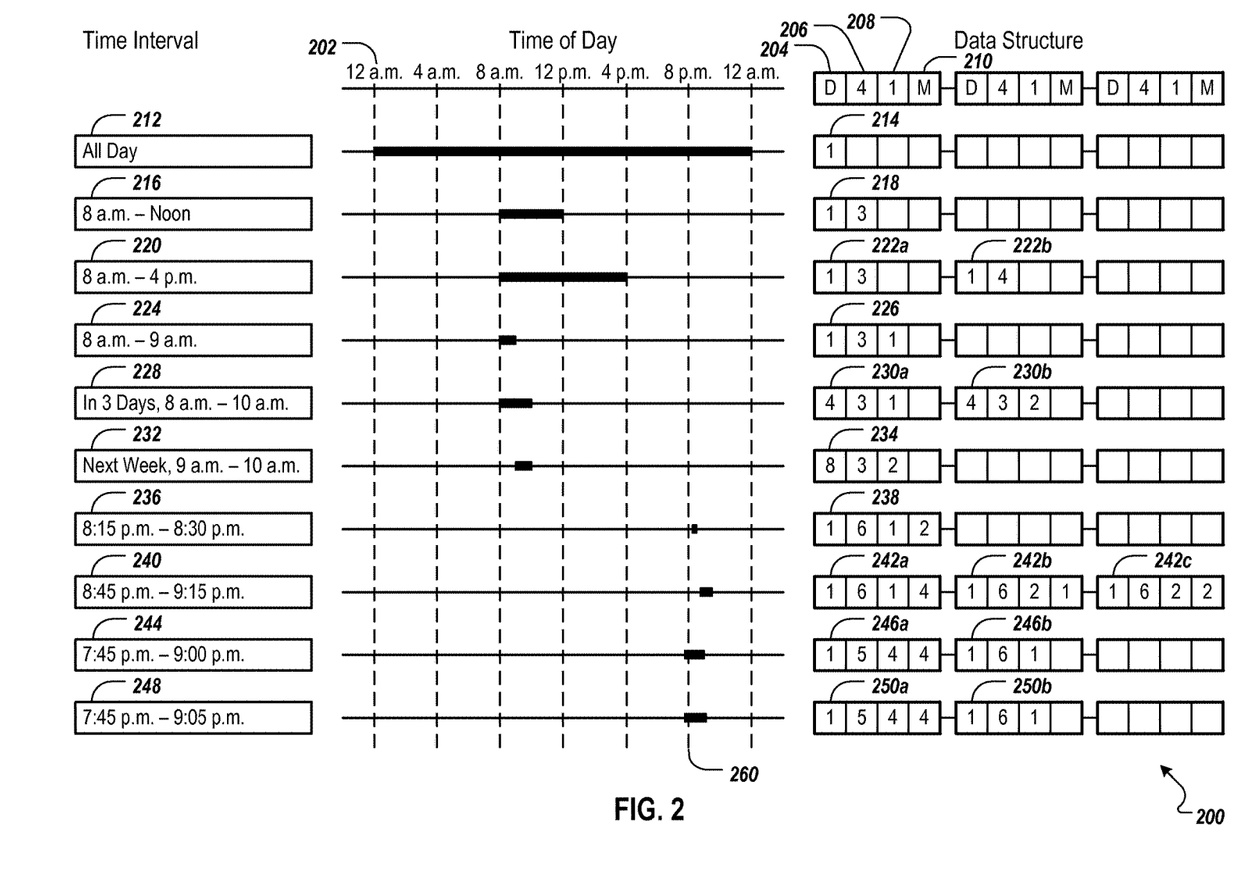
FIG. 2 is a diagram of example encoded time representations for various time intervals.

FIG. 2 is a diagram of example encoded time representations 200 for various time intervals. In general, an encoded representation (e.g., a string token) of a time interval may include a series of values (e.g., byte values), each value representing a progressively more granular block of time. For example, an initial series of bytes in a string token may represent a high-level offset (e.g., a number of days) from a predetermined baseline time (e.g., a start date/time), subsequent bytes in the string token may represent a lower-level offset (e.g., a block of hours) from the higher-level offset, further subsequent bytes in the string token may represent a further lower-level offset (e.g., an hour in the block of hours), and so forth. Time intervals, for example, may include ranges of time in which a provider (e.g., an expert assistant) has indicated availability, and may include ranges of time in which a user (e.g., a requester of a provider's services) wants to determine whether a provider is available.

For the purpose of illustration, 12 am midnight of the previous/current day may be selected as a baseline time 202 for an encoding scheme; however, other dates/times may be selected as baseline times (e.g., a fixed date/time in the past, such as 12 am midnight, Dec. 31, 1999/Jan. 1, 2000). To encode a time interval 212 ("All Day") for the current day, for example, a day offset value 204 is identified that specifies a number of days between the baseline time 202 and the beginning of the time interval. In the present example, the offset value for the current day (the "first" day) may be calculated as a value of "1"; however, other implementations may employ zero-based offsets. As no further unencoded sub-intervals exist for the time interval 212 ("All Day"), the encoding process is complete and the time interval 212 may be represented by a data structure 214 (e.g., "1").

Encoding a time interval may include identifying one or more time sub-intervals within the time interval. To encode a time interval 216 (8 am-Noon) for the current day, for example, the day offset value 204 that specifies a number of days between the baseline time 202 and the beginning of the time interval 216 is identified. As discussed above, the day offset value 204 for the current day may be calculated as a value of "1". Next, time sub-interval values are determined. Time sub-interval values may include a multi-hour block value 206 that identifies a multi-hour block within a day. A day can be made up of successive, defined multi-hour blocks that each have the same duration, and the multi-hour block value 206 can identify a position of the multi-hour block among the multi-hour blocks that make up the day. In the present example, a day is divided into six four-hour blocks (e.g., midnight to 4 am, 4 am to 8 am, 8 am to noon, noon to 4 pm, 4 pm to 8 pm, and 8 pm to 12 am); however, other implementations may divide a day into a different number of blocks. As the time interval 216 (8 am-Noon) corresponds with the third time block of the day, for example, a value of "3" may be assigned to the multi-hour block value 206 for the time interval 216. As no further unencoded sub-intervals exist for the time interval 216 (8 am-Noon), the encoding process is complete and the time interval 216 may be represented by a data structure 218 (e.g., "1|3").

The previous examples have illustrated the encoding of time intervals using single data structures (e.g., the data structure 214 and the data structure 218); however, some time intervals may be encoded using multiple data structures. To encode a time interval 220 (8 am-4 pm) for the current day, for example, the day offset value 204 for the current day may be calculated as a value of "1" (e.g., similar to the previous examples). Next, sub-interval values that identify time sub-intervals within the day are determined. To represent a time interval spanning multiple multi-hour blocks, encoding a time interval may include encoding the time interval as a first data structure that identifies an offset value (e.g., a day offset) and a first multi-hour block value within the day, a second data structure that identifies the offset value and a second multi-hour block value within the day, and so forth. For example, the time interval 220 (8 am-4 pm) spans multiple four-hour blocks-specifically, the third block and the fourth block. Thus, in the present example, the portion of the time interval 220 (8 am-4 pm) that corresponds with the third block (8 am-Noon) may be represented by a data structure 222a (e.g., "1|3"), and the portion of the time interval 220 that corresponds with the fourth block (Noon-4 pm) may be represented by a data structure 222b (e.g., "1|4"). To represent the entire time interval 220 (8 am-4 pm), for example, the data structures 222a ("1|3") and 222b ("1|4") may be maintained in association with each other (e.g., concatenated, linked, stored in an array, collection, or list, etc.).

Time sub-interval values may include an hour value 208 that identifies an hour within a multi-hour block within a day. A multi-hour block can be made up of successive hours, and the hour value 208 can identify a position of the hour among the hours that make up the multi-hour block. To encode a time interval 224 (8 am-9 am) for the current day, for example, the day offset value 204 that specifies a number of days between the baseline time 202 and the beginning of the time interval 224 is identified. As discussed above, the day offset value 204 for the current day may be calculated as a value of "1". Next, the multi-hour block value 206 can be determined for the time interval 224 (8 am-9 am). In the present example, the time interval 224 (8 am-9 am) occurs within the third multi-hour block of the day-thus, a value of "3" may be assigned to the multi-hour block value 206 for the time interval 224. Next, the hour value 208 can be determined for the time interval 224 (8 am-9 am). As the time interval 224 (8 am-9 am) corresponds with the first hour of the third multi-hour time block of the day, for example, a value of "1" may be assigned to the hour value 208 for the time interval 224. As no further unencoded sub-intervals exist for the time interval 224 (8 am-9 am), the encoding process is complete and the time interval 224 may be represented by a data structure 226 (e.g., "1|3|1").

The previous examples have illustrated the encoding of time intervals occurring on a day selected as a baseline date/time (e.g., a current day); however, time intervals occurring on future days may also be encoded. To encode a time interval 228 (8 am-10 am) for a day three days from the current day, for example, the day offset value 204 for the future day may be calculated as "4" (e.g., a "first" day, with the addition of three subsequent days). Next, the multi-hour block value 206 can be determined for the time interval 228 (8 am-10 am). In the present example, the time interval 228 (8 am-10 am) occurs within the third multi-hour block of the day-thus, a value of "3" may be assigned to the multi-hour block value 206 for the time interval 228. As the time interval 228 (8 am-10 am) spans multiple hours within the third multi-hour block, for example, the portion of the time interval 228 that corresponds with the first hour in the block (8 am-9 am) may be represented by a data structure 230a (e.g., "4|3|1") and the portion of the time interval 228 that corresponds with the second hour in the block (9 am-10 am) may be represented by a data structure 230b (e.g., "4|3|2"). To represent the entire time interval 228 (In 3 Days, 8 am-10 am), for example, the data structures 230a ("4|3|1") and 230b ("4|3|2") may be maintained in association with each other.

As another example of encoding a time interval occurring on a future day, a time interval 232 (9 am-10 am) is encoded for a day one week from the current day. First, the day offset value 204 for the future day may be calculated as "8" (e.g., a "first" day, with the addition of seven subsequent days). Next, the multi-hour block value 206 can be determined for the time interval 232 (9 am-10 am). In the present example, the time interval 232 (9 am-10 am) occurs within the third multi-hour block of the day-thus, a value of "3" may be assigned to the multi-hour block value 206 for the time interval 232. Next, the hour value 208 can be determined for the time interval 232 (9 am-10 am). In the present example, as the time interval 232 (9 am-10 am) corresponds with the second hour of the third multi-hour time block of the day, a value of "2" may be assigned to the hour value 208 for the time interval 232. As no further unencoded sub-intervals exist for the time interval 232 (Next Week, 9 am-10 am), the encoding process is complete and the time interval 232 may be represented by a data structure 234 (e.g., "8|3|2").

Time sub-intervals may include a sub-hour value 210 that identifies a portion of an hour within a multi-hour block within a day. An hour block can be made up of successive portions of an hour that each have the same duration, and the sub-hour value 210 can identify a position of the portion of the hour among the portions of the hour that make up the hour. In the present example, an hour may be divided into four fifteen-minute blocks (e.g., 0-15 minutes, 15-30 minutes, 30-45 minutes, and 45 to 60 minutes); however other implementations may divide an hour into a different number of blocks (e.g., 2, 3, 5, 6, 10, 12, 20, 30, 60).

As an example of a time interval that may be encoded at a sub-hour level, a time interval 236 (8:15 pm-8:30 pm) is encoded. First, the day offset value 204 for the current day may be calculated as "1" (e.g., a "first" day). Next, the multi-hour block value 206 can be determined for the time interval 236 (8:15 pm-8:30 pm). In the present example, the time interval 236 (8:15 pm-8:30 pm) occurs within the sixth multi-hour block of the day-thus, a value of "6" may be assigned to the multi-hour block value 206 for the time interval 236. Next, the hour value 208 can be determined for the time interval 236 (8:15 pm-8:30 pm). In the present example, the time interval 236 (8:15 pm-8:30 pm) occurs within the first hour of the sixth multi-hour block-thus, a value of "1" may be assigned to the hour value 208 for the time interval 236. Next, the sub-hour 210 can be determined for the time interval 236 (8:15 pm-8:30 pm). In the present example, as the time interval 236 (8:15 pm-8:30 pm) corresponds with the second sub-hour block of the first hour of the sixth multi-hour block of the day, a value of "2" may be assigned to the sub-hour value 210 for the time interval 236. As no further unencoded sub-intervals exist for the time interval 236 (8:15 pm-8:30 pm), the encoding process is complete and the time interval 236 may be represented by a data structure 238 (e.g., "1|6|1|2")

In general, time intervals may be made up of time sub-intervals of different levels or granularities (e.g., day, multi-hour block, hour, sub-hour, etc.), and may span different time interval boundaries. For example, a time interval may be made up of multiple sub-hour portions included in different hours of the day. To encode a time interval 240 (8:45 pm-9:30 pm) for the current day, for example, the day offset value 204 for the current day may be first calculated as "1". Next, the multi-hour block value 206 can be determined for the time interval 240 (8:45 pm-9:30 pm). In the present example, the entire time interval 240 (8:45 pm-9:30 pm) occurs within the sixth multi-hour block of the day-thus, a value of "6" may be assigned to the multi-hour block value 206 for the time interval 240. Next, hour values 208 can be determined for the time interval 240 (8:45 pm-9:30 pm). As the time interval 240 (8:45 pm-9:30 pm) spans an hour-level boundary (e.g., the 9:00 pm boundary), multiple data structures may be used to encode the time interval. For example, a data structure 242a (e.g., "1|6|1|4") may represent the first sub-hour portion (e.g., the 15 minute portion from 8:45 pm-9:00 pm) of the time interval 240 (8:45 pm-9:30 pm), as the data structure 242a corresponds with the fourth sub-hour block of the first hour of the sixth multi-hour block of the day. As the portion of the time interval 240 (8:45 pm-9:30 pm) occurring after 9:00 pm (e.g., 9:00 pm-9:30 pm) does not span an entire hour, multiple data structures may be used to encode the portion at the sub-hour level. A data structure 242b (e.g., "1|6|2|1"), for example, may represent the second sub-hour portion (e.g., the 15 minute portion from 9:00 pm-9:15 pm) of the time interval 240 (8:45 pm-9:30 pm), as the data structure 242b corresponds with the first sub-hour block of the second hour of the sixth multi-hour block of the day. A data structure 242c (e.g., "1|6|2|2"), for example, may represent the third sub-hour portion (e.g., the 15 minute portion from 9:15 pm-9:30 pm) of the time interval 240 (8:45 pm-9:30 pm), as the data structure 242c corresponds with the second sub-hour block of the second hour of the sixth multi-hour block of the day. To represent the entire time interval 240 (8:45 pm-9:30 pm), for example, the data structures 242a ("1|6|1|4"), 242b ("1|6|2|1"), and 242c ("1|6|2|2") may be maintained in association with each other.

As another example, a time interval may be made up of a sub-hour portion and one or more hour or multi-hour portions. To encode a time interval 244 (7:45 pm-9:00 pm) for the current day, for example, the day offset value 204 for the current day may be first calculated as "1". Next, multi-hour block values 206 can be determined for the time interval 244 (7:45 pm-9:00 pm). In the present example, the time interval 244 (7:45 pm-9:00 pm) spans a boundary 260 between the fifth and the sixth multi-hour blocks. Thus, multiple data structures may be used to encode the time interval. A data structure 246a (e.g., "1|5|4|4") may represent the portion of the time interval 244 (7:45 pm-9:00 pm) occurring before the multi-hour block boundary 260 (i.e., the earlier portion, 7:45 pm-8:00). That is, the example data structure 246a ("1|5|4|4") corresponds with the fourth sub-hour block of the fourth hour of the fifth multi-hour block of the day. A data structure 246b (e.g., "1|6|1") may represent the portion of the time interval 244 (7:45 pm-9:00 pm) occurring after the multi-hour block boundary 260 (i.e., the later portion, 8:00 pm-9:00 pm). That is, the example data structure 246b ("1|6|1") corresponds with the first hour of the sixth multi-hour block of the day. To represent the entire time interval 244 (7:45 pm-9:00 pm), for example, the data structures 244a ("1|5|4|4") and 244b ("1|6|1") may be maintained in association with each other.

A time interval may or may not be encoded which includes a portion of an hour that has a shorter duration than a defined sub-hour duration (e.g., a portion of hour that is shorter than fifteen minutes). To encode a time interval 248 (7:45 pm-9:05 pm) for the current day, for example, the day offset value 204 for the current day may be first calculated as "1". Similar to the time interval 244 (7:45 pm-9:00 pm), for example, the time interval 248 (7:45 pm-9:05 pm) includes a single sub-hour portion (7:45 pm-8:00 pm) occurring before the boundary 260 between the fifth and sixth multi-hour blocks, and a single hour portion (8:00 pm-9:00 pm) occurring after the boundary 260. Thus, the portion of the time interval 244 (7:45 pm-9:05 pm) spanning the time range of (7:45 pm-9:00 pm) may be similarly encoded within data structures 250a (e.g., "1|5|4|4") and 250b (e.g., "1|6|1"). The remaining portion of the time interval 248 (7:45 pm-9:05 pm) in the present example—that is, the time range spanning (9:00 pm-9:05 pm), has a shorter duration (five minutes) than the sub-hour duration (e.g., fifteen minutes) defined for the present encoding scheme. Thus, in the present example, if a period of availability were to be encoded, the remaining time portion may be discarded, and the time interval 248 (7:45 pm-9:05 pm) may be represented by the data structures 250a ("1|5|4|4") and 250b ("1|6|1"). If a requested time period were to be encoded, however, in some implementations the remaining time period may be "rounded up" to the defined sub-hour duration (e.g., fifteen minutes), encoded, and associated with the other data structures representing the requested time period.

Various example encoded time representations 200 have been described for various time intervals; however, other sorts of time intervals may be encoded. For example, a time interval may span a boundary between multiple days, and/or may include one or more discontinuous time segments.

Figure 3:
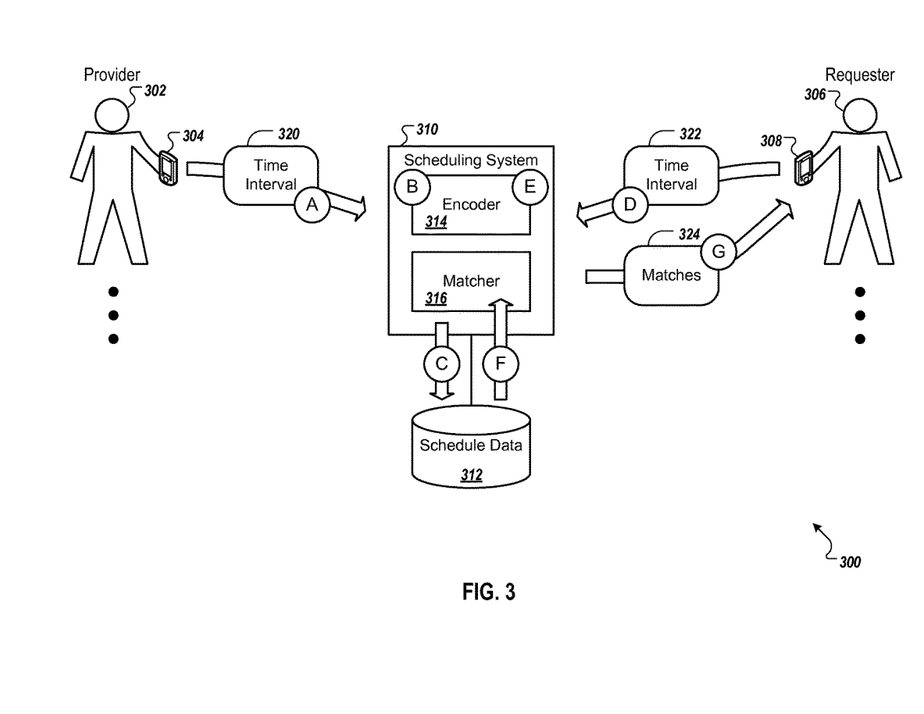
FIG. 3 is a diagram of an example system than can encode, store, and match time interval information.

FIG. 3 is a diagram of an example system 300 than can encode, store, and match time interval information. FIG. 3 also illustrates an example flow of data, shown in stages (A) to (G). Stages (A) to (G) may occur in the illustrated sequence, or they may occur in a sequence that is different than in the illustrated sequence.

The system 300, for example, includes a scheduling system 310 (e.g., similar to the scheduling system 160, shown in FIG. 1). The scheduling system 310, for example, may include one or more servers which may each include one or more processors configured to execute instructions stored by a computer-readable medium for performing various operations, such as input/output, communication, data processing, and the like. The scheduling system 310 may communicate with portable or stationary computing devices (e.g., servers, personal computers, smartphones, or other appropriate computing devices) using wired and/or wireless network connections.

The scheduling system 310 can encode the availability times of various providers (e.g., expert assistants) as data structures, and can store the data structures as schedule data 312. To encode schedule data, for example, the scheduling system 310 can use an encoder 314 (e.g., a hardware and/or software-based module). Various requesters (e.g., users of the expert assistants' services) can query the schedule data 312 to determine whether a provider is available during a specified time interval. To identify time interval matches, for example, the scheduling system 310 can use a matcher 316 (e.g., a hardware and/or software-based module).

Referring to the example data flow, during stage (A), a provider 302 (e.g., an automobile mechanic) can use a client computing device 304 (e.g., a laptop computer, a tablet computer, a smartphone, etc.) to provide a time interval in which the provider is available for providing assistance to users. For example, the provider 302 may specify a time interval of availability as ranging between 1:00 pm and 4:00 pm tomorrow.

During stage (B), data 320 specifying the time interval in which the provider 302 is available can be received and encoded by the scheduling system 310. For example, the scheduling system 310 can provide the data 320 (e.g., 1:00 pm-4:00 pm, tomorrow) to the encoder 314 for encoding. In general, time intervals may be encoded as one or more data structures that each identify an offset value that specifies a time offset between a baseline time and a beginning of a reference time interval, and one or more respective time interval values that identify one or more time sub-intervals within the reference time interval. Using the encoding scheme described in association with FIG. 2, for example, the data 320 (1:00 pm-4:00 pm, tomorrow) may be encoded as the series of data structures "2|4|2", "2|4|3", and "2|4|4". That is, the initial portion of each data structure (e.g., the value "2") in the present example may refer to a time offset between a baseline time (e.g., midnight of the previous/current day) and a beginning of a reference time interval (e.g., 1:00 pm, tomorrow). The subsequent portions of each data structure (e.g., the values "4|2", "4|3", and "4|4") in the present example may refer to three consecutive one-hour time intervals within the reference time interval (e.g., 1:00 pm-4:00 pm) that respectively correspond to the second, third, and fourth hours of the fourth multi-hour block.

During stage (C), the data structures can be stored in association with the provider 302. For example, each of the series of data structures "2|4|2", "2|4|3", and "2|4|4" representing the time interval "1:00 pm-4:00 pm, tomorrow" may be maintained in association the provider 302 and in association with each other (e.g., concatenated, linked, stored in an array, collection, or list, etc.), as schedule data 312.

During stage (D), a requester 306 can submit a query specifying a time interval in which to determine whether a provider is available. For example, the requester 306 can use a client computing device 308 (e.g., a laptop computer, a tablet computer, a smartphone, etc.) to submit a desired time range (e.g., 2:00 pm-3:00 pm, tomorrow) in which the requester would like the services of a particular provider (e.g., the provider 302), or a general type of provider (e.g., an unspecified provider of a class of services, such as "a mechanic who works on hybrid automobiles"). Thus, in some implementations, a query submitted by a requestor may include a requested time interval and may include additional metadata such as areas of expertise, prices, referrals, ratings, and so forth.

During stage (E), data 322 specifying the time interval in which to determine whether a provider (e.g., the provider 302, or an unspecified provider) is available can be received and encoded by the scheduling system 310. For example, the scheduling system 310 can provide the data 322 (e.g., 2:00 pm-3:00 pm, tomorrow) to the encoder 314 for encoding as a query data structure. Using the encoding scheme described in association with FIG. 2, for example, the data 322 (2:00 pm-3:00 pm, tomorrow) may be encoded as the query data structure "2|4|3". That is, the initial portion of the data structure (e.g., the value "2") in the present example may refer to a time offset between a baseline time (e.g., midnight of the previous/current day) and a beginning of a reference time interval (e.g., 2:00 pm, tomorrow). The subsequent portion of the data structure (e.g., the values "4|3") in the present example, may refer to a single one-hour time interval within the reference time interval (e.g., 2:00 pm-3:00 pm) that corresponds to the third hour of the fourth multi-hour block.

During stage (F), a determination can be made of whether one or more query data structures (e.g., encoded data structures based on the time interval data 322 provided by the requester 306) match one or more data structures stored in association with a provider (e.g., encoded data based on the time interval data 320 stored as schedule data 312). For example, the scheduling system 310 can use the matcher 316 to access the schedule data 312 and to determine whether the query data structure (e.g., "2|4|3") matches any of the stored data structures (e.g., "2|4|2", "2|4|3", and "2|4|4") associated with the provider's 302 availability times. The matcher 316 may identify a match, for example, by performing a lookup on a series of contiguous tokens. In the present example, the second token "2|4|3" stored in association with the provider 302 is identified by the matcher 316 as a match for the query data structure "2|4|3" of the requester 306. As another example, the matcher 316 may identify a match by prefix matching. For example, if the provider 302 were to be available "all day tomorrow", or "between noon and 4:00 pm tomorrow", using the encoding scheme described in association with FIG. 2, the provider's availability times would be encoded as "2", and as "2|4", respectively. By using prefix matching, for example, the matcher 316 may identify a match between the query data structure "2|4|3" and either of the encoded data structures "2" or "2|4".

During stage (G), information associated with one or more identified matching data structures can be provided to the requester 306. For example, information about various providers who are available for providing services during a time interval specified by the requester 306 can be received by the client computing device 308 and presented to the requestor 306 by an interface. In the present example, as the provider 302 is identified as being available during the time interval queried by the requester 306, information about the provider may be presented, and the requester may choose to book an appointment for the provider's services.

Figure 4:
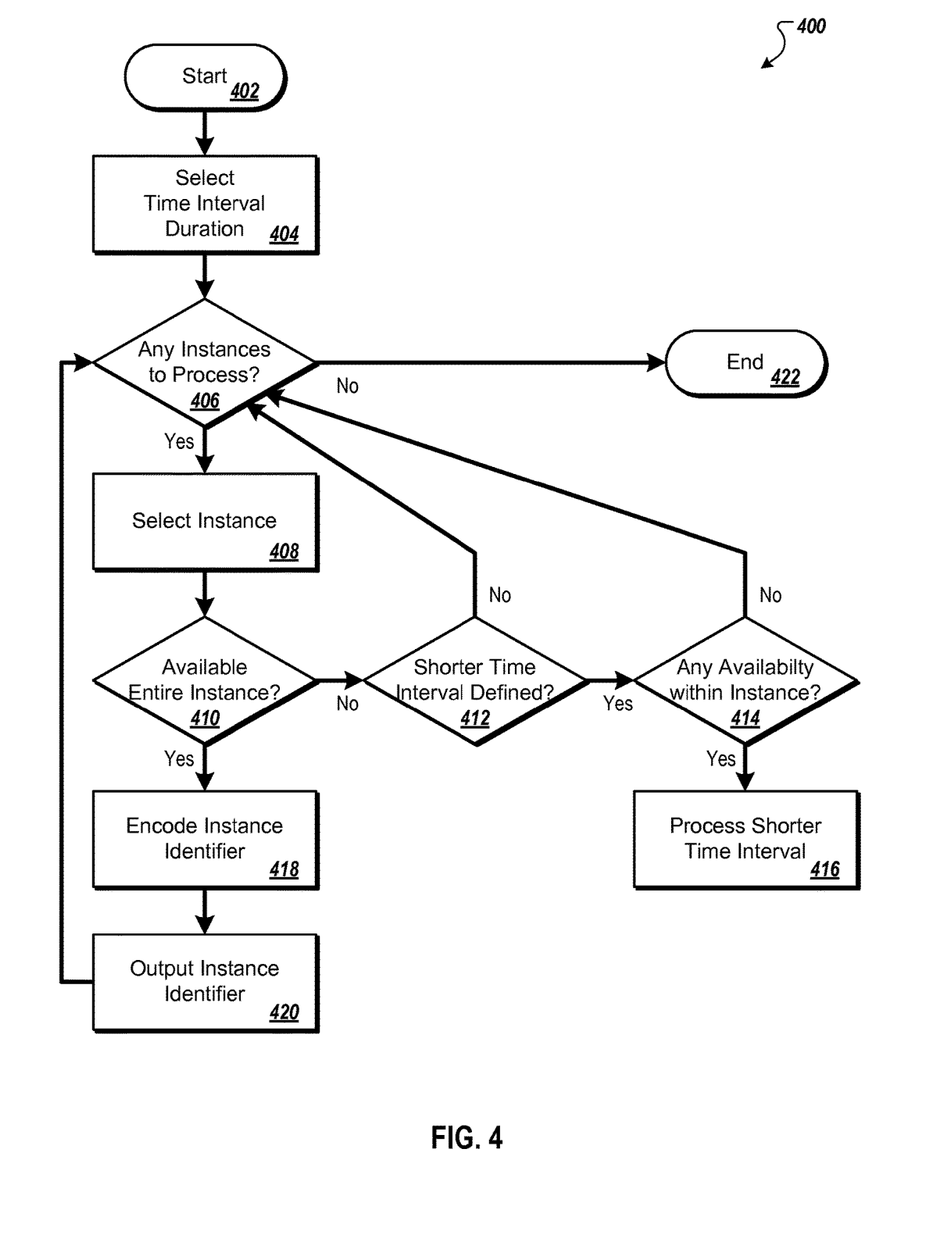
FIGS. 4 and 5 are flow charts illustrating example processes for encoding time interval information.

FIG. 4 is a flow chart illustrating an example process 400 for encoding time interval information. In some implementations, the process 400 may be performed by the systems 100 and/or 300, and will be described as such for clarity. Briefly, the process 400 includes selecting a time interval duration, iteratively processing one or more instances (e.g., time block instances) associated with the time interval, encoding one or more instance identifiers, and outputting the identifier(s).

In more detail, when the process 400 begins (402), a time interval duration is selected (404). Referring to FIG. 3, for example, a time interval of "between noon and 4 pm tomorrow" can be specified by the provider 302 using the client computing device 304 and can be selected by the scheduling system 310 for processing by the encoder 314. A determination (406) is made of whether any instances (i.e., time block instances) are available for processing for the selected time interval. In some implementations, high-level (long) time blocks may be processed initially, followed by progressively lower-level (shorter) time blocks. In some implementations, low-level (short) time blocks may be processed initially, and may subsequently be collapsed into higher-level (longer) blocks when appropriate. Considering the encoding scheme described in association with FIG. 2, for example, time intervals may be encoded at the level of day, multi-hour, hour, and sub-hour. Thus, in the present example, a day-level time block instance may be initially processed for the time interval of "between noon and 4 pm tomorrow". As a day-level instance (e.g., the day "tomorrow") is available for processing in the present example (that is, the instance has not yet been processed), the instance is selected (408).

A determination (410) is made of whether availability (e.g., provider availability) exists for the entire selected time block instance. In the present example, the encoder 314 can determine that the provider 302 is not available for the entire selected time block instance (e.g., the day "tomorrow"), based on the provider's specified time interval duration (e.g., "between noon and 4 pm tomorrow"). Next, a determination (412) is made of whether shorter time intervals are defined. In the present example, multi-hour segments (e.g., four-hour blocks) are defined. Next, a determination (414) is made of whether any availability (e.g., provider availability) exists within the selected time block instance. In the present example, the encoder 314 can determine that the provider 302 is available for part of the selected time block instance (e.g., the day "tomorrow"), based on the provider's specified time interval duration (e.g., "between noon and 4 pm tomorrow"). Thus, in the present example, the encoder 314 may continue processing (416), using a shorter time interval (e.g., a four-hour block).

Reentering the process 400, for example, the time interval duration (e.g., "between noon and 4 pm tomorrow") is again selected (404), a determination (406) is made that time block instances (e.g., four-hour blocks) are available for processing for the selected time interval, and the first time block instance (e.g., the first four-hour block, midnight-4 am) is selected (408). Continuing the process 400, a determination (410) is made that the provider is not available for the entire selected block instance (e.g., midnight-4 am), a determination (412) is made that shorter time interval (e.g., one-hour blocks) are defined, and a determination (414) is made that no provider availability exists within the selected block instance.

Returning to step (406), for example, since additional time block instances (e.g., four-hour blocks) are available for processing, the next sequential time block instance (e.g., the second four-hour block, 4 am-8 am) is selected (408). Based on the provider's specified time interval duration (e.g., "between noon and 4 pm tomorrow"), a determination (410) is made that the provider is not available for the entire selected block instance (e.g., 4 am-8 am), a determination (412) is made that shorter time interval (e.g., one-hour blocks) are defined, and a determination (414) is made that no provider availability exists within the selected block instance. In the present example, steps 406, 408, 410, 412, and 414 may repeat, as subsequent time block instances (e.g., four-hour blocks) are selected and checked for provider availability.

In the present example, when the fourth time block instance (e.g., the fourth four-hour block, noon-4 pm) is selected (408), a determination (410) is made that the provider is available for the entire instance, based on the provider's specified time interval duration (e.g., "between noon and 4 pm, tomorrow"). An instance identifier is encoded (418) by the encoder 314 for the selected instance. Using the encoding scheme described in association with FIG. 2, for example, the selected time block instance (e.g., noon-4:00 pm, tomorrow) may be encoded as the data structure "2|4", and thus may be identified as "the fourth four-hour block of the second day". The encoded instance identifier is output (420), and may be stored as schedule data 312 and/or maintained and subsequently associated with other instance identifiers related to the specified time interval duration (e.g., the provider's availability).

In the present example, steps 406, 408, 410, 412, and 414 may repeat for the fifth and sixth time block instances (e.g., four-hour blocks). After processing the last (e.g., sixth) time block instance (e.g., 8 pm-midnight) of the day, for example, a determination (406) is made that no additional time block instances exist for processing, thereby ending (422) the process. Encoding time interval durations corresponding to a provider's availability have been described in association the process 400; however, other time interval durations (e.g., a time interval duration specified by a requester of a provider's time) may also be encoded using the process 400.

Figure 5:
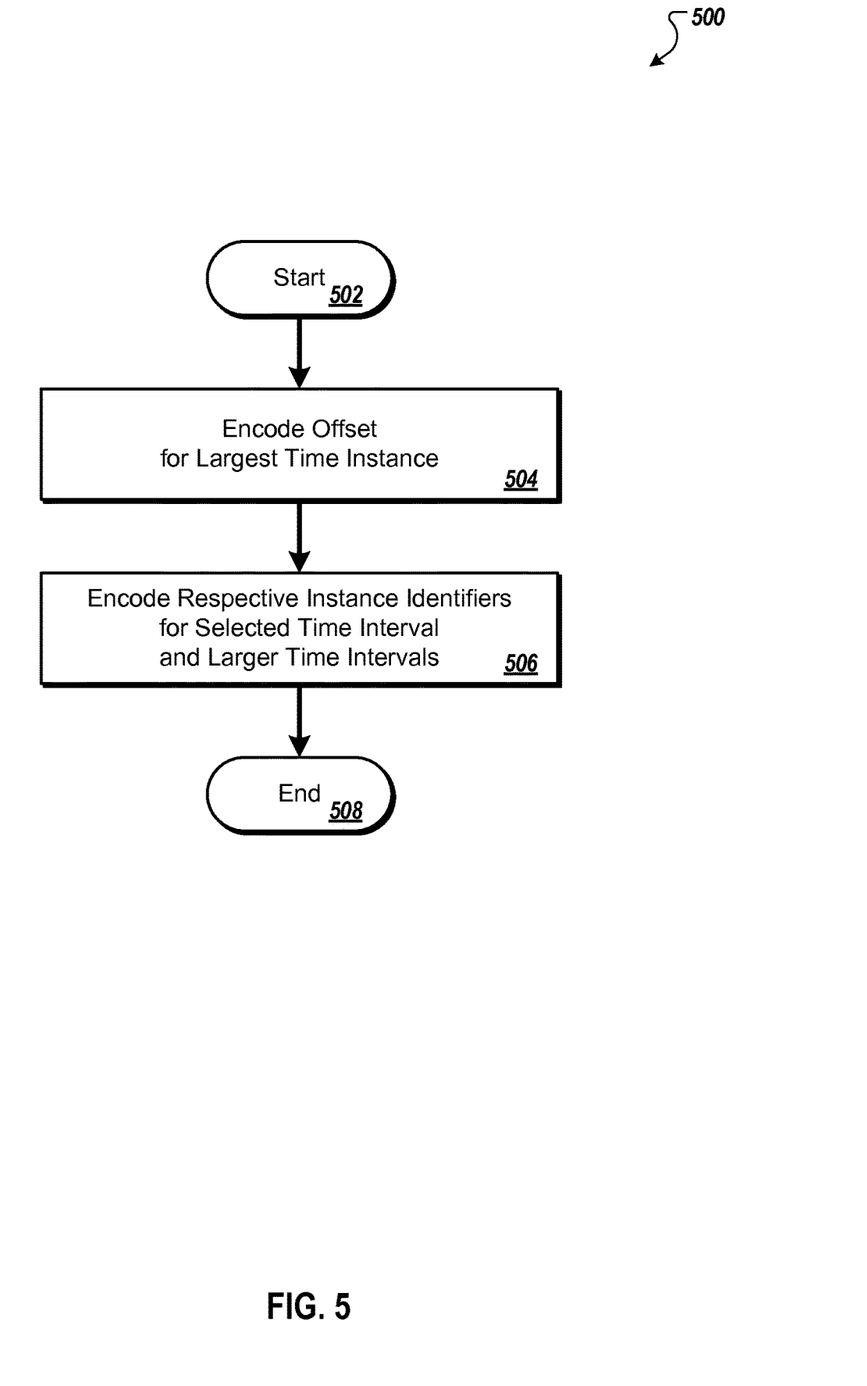

FIG. 5 is a flow chart illustrating an example process 500 for encoding time interval information. In some implementations, the process 500 may be performed by the systems 100 and/or 300, and will be described as such for clarity. Briefly, the process 500 includes encoding an offset for a largest time instance (e.g., a day), and encoding respective instance identifiers for a selected time interval (e.g., a block of hours, an hour, a sub-hour block, etc.) and larger time intervals. In general, time intervals may be encoded at various granularities or "levels", including a high level (e.g., a day) and one or more lower levels (e.g., sub-intervals including multi-hour blocks, hour blocks, and sub-hour blocks).

In more detail, when the process 500 begins (502), an offset is encoded (504) for a largest time instance. Referring to FIG. 3, for example, the scheduling system 310 can receive time interval data 320 associated with the provider 302 and/or time interval data 322 associated with the requester 306. For example, the provider 302 can use the client computing device 304 to specify an availability time interval of "between noon and 4 pm tomorrow". Upon receiving time interval data, for example, the scheduling system 310 can use the encoder 314 to encode the time interval data as one or more data structures.

To encode a largest time instance (i.e., a highest-level time block instance), an offset value can be identified that specifies a time offset between a baseline time and the beginning of a reference time interval. For example, to identify a day offset value between a baseline time (e.g., midnight of the previous/current day) and the beginning of the provider's 302 availability time interval (e.g., "noon tomorrow"), the encoder 314 can count a number of intervening time units at the highest block level. In the present example (e.g., a one-based encoding scheme), a baseline day may be associated with a value of "1", the following day may be associated with a value of "2", and so forth. Thus, in the present example, the offset for the largest time instance (e.g., a day) may be assigned a value of "2".

Respective instance identifiers are encoded (506) for selected time intervals and larger time intervals, thereby ending (508) the process. In general, to encode respective identifiers for selected time intervals, one or more respective time sub-interval values may be identified that identify one or more time sub-intervals within a reference time interval. Considering the provider's 302 availability time interval (e.g., "between noon and 4 pm tomorrow), for example, a single four-hour block corresponding with "the fourth four-hour block of the day" may be identified and encoded as "2|4". As another example, if the provider's 302 time interval were to be "between 1 pm and 4 pm tomorrow", three consecutive hour blocks (e.g., "the second hour of the fourth four-hour block", "the third hour of the fourth four-hour block", and "the fourth hour of the fourth four-hour block") may be identified and encoded as "2|4|2", "2|4|3", and "2|4|4", respectively. Upon encoding a time interval as one or more data structures, for example, the scheduling system 310 can store the data structures in association with the provider 302 as schedule data 312, or can use the data structures to identify matches with previously and/or subsequently encoded time representations.

In some implementations, time intervals may be encoded sequentially. For example, a time interval information encoding algorithm may include initially encoding the smallest applicable time block which may be included at the beginning of a specified time interval, progressively moving forward in time toward the boundaries of progressively larger time blocks while encoding any encountered blocks, and then moving forward in time toward the boundaries of progressively smaller time blocks while encoding any encountered blocks, until the end of the specified time interval is reached. Considering a time interval of 12:45 pm-8:15 pm, for example, the smallest applicable time block (e.g., a fifteen-minute block) at the beginning (e.g., 12:45 pm-1:00 pm) of the interval is initially encoded. Next, for example, three consecutive larger one-hour blocks (e.g., 1:00 pm-2:00 pm, 2:00 pm-3:00 pm, and 3:00-4:00 pm) are encoded. Next, for example, a progressively larger four-hour block (e.g., 4:00 pm-8:00 pm) is encoded. In the present example, another four-hour block is not applicable for the remainder of the time interval, nor is a smaller hour-block, so an even smaller fifteen-minute block (e.g., 8:00 pm-8:15 pm) is encoded.

Figure 6:
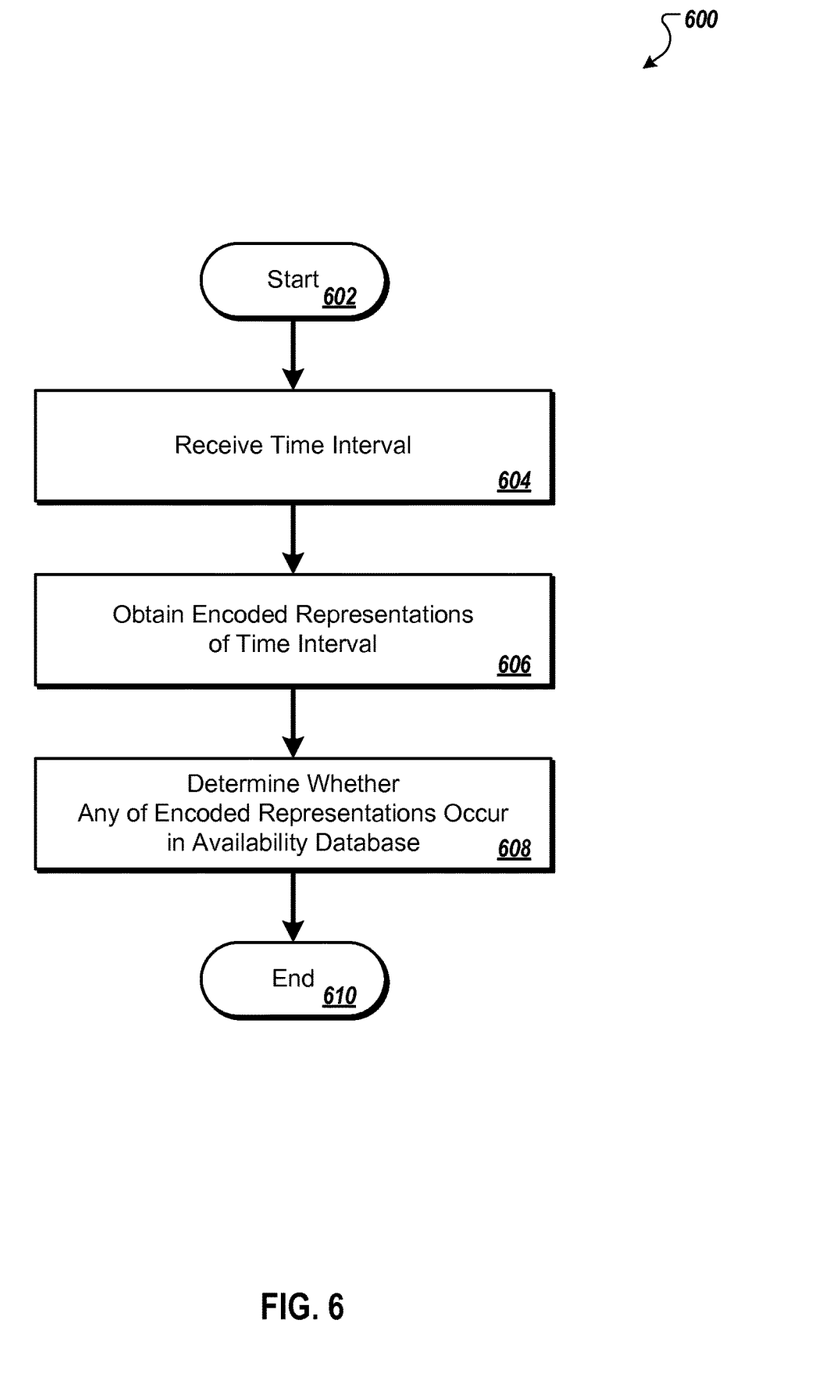
FIG. 6 is a flow chart illustrating an example process for determining whether an encoded time representation matches one or more previously encoded time representations.

FIG. 6 is a flow chart illustrating an example process 600 for determining whether an encoded time representation matches one or more previously encoded time representations. In some implementations, the process 600 may be performed by the systems 100 and/or 300, and will be described as such for clarity. Briefly, the process 600 includes receiving a time interval, obtaining one or more encoded representations of the time interval, and determining whether any of the encoded representations occur in an availability database.

In more detail, when the process 600 begins (602), a time interval is received (604). Referring to FIG. 3, for example, the scheduling system 310 can receive time interval data 322 associated with the requester 306. For example, the requester 306 may want to identify a provider (e.g., an expert assistant such as an automobile mechanic) who may be available during a specified time interval (e.g., "between 3:45 pm and 4:15 pm").

One or more encoded representations of the time interval are obtained (606). In general, encoding a time interval in which to determine whether a provider is available may include encoding the time interval as one or more query data structures that each identify an offset value between a baseline time and the beginning of the time interval, and one or more respective time sub-interval values within the time interval. Using the encoding scheme described in association with FIG. 2, for example, the encoder 314 can encode the specified time interval as a series of query data structures "1|4|4|4" (i.e., 3:45 pm-4:00 pm, or "the fourth 15-minute sub-hour block of the fourth hour of the fourth four-hour block of the day") and "1|5|1|1" (i.e., 4:00 pm-4:15 pm, or "the first 15-minute sub-hour block of the first hour of the fifth four-hour block of the day).

A determination (608) is made of whether any of the encoded representations occur in an availability database, thereby ending (610) the process. In general, a match may be identified if each of one or more query data structures that collectively represent a searched time interval matches at least one data structure associated with a provider's availability. For example, if the provider 302 were to be available "all day", the provider may be associated with an encoded data structure of "1" (i.e. "all day") in the schedule data 312. The matcher 316 can use prefix matching, for example, to identify the provider's encoded data structure as a match for each of the query data structures "1|4|4|4" and "1|5|1|1", and thus determine that the provider 302 is available during the time interval ("between 3:45 pm and 4:15 pm") queried by the requester 306.

Matches between multiple query data structures and previously encoded data structures may be combined to identify a match for query data structures that collectively represent a searched time interval. For example, if the provider 302 were to be associated with an encoded data structure of "1|4" (i.e., noon-4 pm, or "the fourth four-hour block of the day"), "1|4|4" (i.e., 3 pm-4 pm, or "the fourth hour of the fourth four-hour block of the day"), or "1|4|4|4" (i.e., 3:45-4:00 pm, or "the fourth 15-minute sub-hour block of the fourth hour of the fourth four-hour block of the day"), the matcher 316 could identify a match with the first of the series of query data structures "1|4|4|4", (i.e., 3:45 pm-4:00 pm). Similarly, in the present example, if the provider 302 were to be associated with an encoded data structure of "1|5" (i.e., 4 pm-8 pm, or "the fifth four-hour block of the day"), "1|5|1" (i.e., 4 pm-5 pm, or "the first hour of the fifth four-hour block of the day"), or "1|5|1|1" (i.e., 4:00-4:15 pm, or "the first 15-minute sub-hour block of the first hour of the fifth four-hour block of the day"), the matcher 316 could identify a match with the second of the series of query data structures "1|5|1|1" (i.e., 4:00 pm-4:15 pm). To identify a match for the entire specified time interval (e.g., "between 3:45 pm and 4:15 pm"), for example, a query data structure match with any one of the first set of possible encoded data structures ("1|4", "1|4|4", or "1|4|4|4") in combination with a query data structure match with any one of the second set of possible encoded data structures ("1|5", "1|5|1", or "1|5|1|1") would indicate an overall match for the specified time interval.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by one or more computer servers, data specifying a time interval in which a provider is available;
   encoding, by the one or more computer servers, the time interval in which the provider is available as a plurality of data structures, each data structure identifying (i) an offset value that specifies a time offset between a baseline time and a beginning of a reference time interval, and (ii) one or more respective time sub-interval values that identify one or more time sub-intervals within the reference time interval, wherein the one or more respective time sub-interval values includes a multi-hour block value that identifies a multi-hour block within a day in which the provider is available, wherein the day is made up of successive, defined multi-hour blocks that each have a same duration, and the multi-hour block value identifies a position of the multi-hour block among the multi-hour blocks that make up the day; and storing the plurality of data structures in association with each other as string tokens as a representation of the time interval in which the provider is available, in association with the provider;

receiving a query specifying a query time interval in which to determine whether the provider is available;

encoding the query time interval in which to determine whether the provider is available as one or more query data structures that each identify (i) a query offset value that specifies a query time offset between the baseline time and a beginning of a query reference time interval, and (ii) one or more respective time sub-interval values that identify one or more time sub-intervals within the query reference time interval; and determining whether the one or more of the query data structures match one or more of the plurality of data structures that are stored in association with the provider, including determining that the one or more of the query data structures matches a prefix of at least one of the one or more of the plurality of data structures that are stored in association with the provider.

2. The method of claim 1, wherein the offset value specifies a number of days between the baseline time and a beginning of a day in which the provider is available.

3. The method of claim 1, wherein encoding the time interval comprises encoding the time interval as (i) a first data structure that identifies the offset value and a first multi-hour block value within the day in which the provider is available, and (ii) a second data structure that identifies the offset value and a second multi-hour block value within the day in which the provider is available.

4. The method of claim 1, wherein the one or more respective time sub-interval values include an hour value that identifies an hour within the multi-hour block within the day in which the provider is available.

5. The method of claim 4, wherein the multi-hour block is made up of successive hours, and the hour value identifies a position of the hour among the hours that make up the multi-hour block.

6. The method of claim 4, wherein the one or more respective time sub-interval values include a sub-hour value that identifies a portion of the hour within the multi-hour block within the day in which the provider is available.

7. The method of claim 6, wherein the hour is made up of successive portions of the hour that each have a same duration, and the sub-hour value identifies a position of the portion of the hour among the portions of the hour that make up the hour.

8. The method of claim 7, wherein the defined multi-hour blocks each have a duration of four hours, and wherein the successive portions of the hour each have a duration of fifteen minutes.

9. The method of claim 1, wherein storing the plurality of data structures in association with each other as the representation of the time interval includes storing the plurality of data structures as a series of data structures in which a first data structure that represents an earlier portion of the time interval precedes a second data structure that represents a later portion of the time interval.

10. A computer-readable storage device storing software comprising instructions executable by one or more computers which, upon such execution, cause the one or more computers to perform operations comprising:

receiving, by one or more computer servers, data specifying a time interval in which a provider is available;

encoding, by the one or more computer servers, the time interval in which the provider is available as a plurality of data structures, each data structure identifying (i) an offset value that specifies a time offset between a baseline time and a beginning of a reference time interval, and (ii) one or more respective time sub-interval values that identify one or more time sub-intervals within the reference time interval, wherein the one or more respective time sub-interval values includes a multi-hour block value that identifies a multi-hour block within a day in which the provider is available, wherein the day is made up of successive, defined multi-hour blocks that each have a same duration, and the multi-hour block value identifies a position of the multi-hour block among the multi-hour blocks that make up the day;

storing the plurality of data structures in association with each other as string tokens as a representation of the time interval in which the provider is available, in association with the provider;

receiving a query specifying a query time interval in which to determine whether the provider is available;

encoding the query time interval in which to determine whether the provider is available as one or more query data structures that each identify (i) a query offset value that specifies a query time offset between the baseline time and a beginning of a query reference time interval, and (ii) one or more respective time sub-interval values that identify one or more time sub-intervals within the query reference time interval; and determining whether the one or more of the query data structures match one or more of the plurality of data structures that are stored in association with the provider, including determining that the one or more of the query data structures matches a prefix of at least one of the one or more of the plurality of data structures that are stored in association with the provider.

11. The device of claim 10, wherein the offset value specifies a number of days between the baseline time and a beginning of a day in which the provider is available.

12. The device of claim 11, wherein the one or more respective time sub-interval values include an hour value that identifies an hour within the multi-hour block within the day in which the provider is available, wherein the one or more respective time sub-interval values include a sub-hour value that identifies a portion of the hour within the multi-hour block within the day in which the provider is available, and wherein the hour is made up of successive portions of the hour that each have a same duration, and the sub-hour value identifies a position of the portion of the hour among the portions of the hour that make up the hour.

13. A system comprising:

one or more computers; and a computer-readable medium tangibly embodying a computer program product comprising instructions to cause the one or more computers to perform operations comprising:

receiving, by one or more computer servers, data specifying a time interval in which a provider is available;

encoding, by the one or more computer servers, the time interval in which the provider is available as a plurality of data structures, each data structure identifying (i) an offset value that specifies a time offset between a baseline time and a beginning of a reference time interval, and (ii) one or more respective time sub-interval values that identify one or more time sub-intervals within the reference time interval, wherein the one or more respective time sub-interval values includes a multi-hour block value that identifies a multi-hour block within a day in which the provider is available, wherein the day is made up of successive, defined multi-hour blocks that each have a same duration, and the multi-hour block value identifies a position of the multi-hour block among the multi-hour blocks that make up the day;

storing the plurality of data structures in association with each other as string tokens as a representation of the time interval in which the provider is available, in association with the provider;

receiving a query specifying a query time interval in which to determine whether the provider is available;

encoding the query time interval in which to determine whether the provider is available as one or more query data structures that each identify (i) a query offset value that specifies a query time offset between the baseline time and a beginning of a query reference time interval, and (ii) one or more respective time sub-interval values that identify one or more time sub-intervals within the query reference time interval; and determining whether the one or more of the query data structures match one or more of the plurality of data structures that are stored in association with the provider, including determining that the one or more of the query data structures matches a prefix of at least one of the one or more of the plurality of data structures that are stored in association with the provider.

14. The system of claim 13, wherein the offset value specifies a number of days between the baseline time and a beginning of a day in which the provider is available.

15. The system of claim 14, wherein encoding the time interval comprises encoding the time interval as (i) a first data structure that identifies the offset value and a first multi-hour block value within the day in which the provider is available, and (ii) a second data structure that identifies the offset value and a second multi-hour block value within the day in which the provider is available.

16. The system of claim 14, wherein the one or more respective time sub-interval values include an hour value that identifies an hour within the multi-hour block within the day in which the provider is available, wherein the one or more respective time sub-interval values include a sub-hour value that identifies a portion of the hour within the multi-hour block within the day in which the provider is available, and wherein the hour is made up of successive portions of the hour that each have a same duration, and the sub-hour value identifies a position of the portion of the hour among the portions of the hour that make up the hour.

* * * * *